(12) United States Patent
Yang et al.

(10) Patent No.: US 9,072,119 B2
(45) Date of Patent: Jun. 30, 2015

(54) MOBILE COMMUNICATION DEVICE AND INTEGRATED CIRCUIT THEREOF

(71) Applicant: VIA Telecom, Inc., San Diego, CA (US)

(72) Inventors: Hong-Kui Yang, San Diego, CA (US); Jian Gu, Beijing (CN); Guotong Wang, Beijing (CN); Jing Su, San Diego, CA (US)

(73) Assignee: VIA TELECOM CO., LTD., George Town, Grand Cayman (KY)

( * ) Notice: Subject to any disclaimer, the term of this patent is extended or adjusted under 35 U.S.C. 154(b) by 74 days.

(21) Appl. No.: 13/953,464

(22) Filed: Jul. 29, 2013

(65) Prior Publication Data

US 2014/0308986 A1    Oct. 16, 2014

(30) Foreign Application Priority Data

Apr. 15, 2013 (CN) .......................... 2013 1 0129748

(51) Int. Cl.
*H04B 1/04* (2006.01)
*H04W 88/06* (2009.01)
*H04B 7/00* (2006.01)

(52) U.S. Cl.
CPC ..................................... *H04W 88/06* (2013.01)

(58) Field of Classification Search
CPC ............................... H04W 88/06; H04B 1/406
USPC ................................. 455/127.4, 552.1–553.1
See application file for complete search history.

(56) References Cited

U.S. PATENT DOCUMENTS

| 6,411,820 B1* | 6/2002 | Margarit et al. ............ 455/553.1 |
| 2005/0159153 A1* | 7/2005 | Mousseau et al. ......... 455/432.1 |
| 2007/0019109 A1* | 1/2007 | Lombardi et al. ............ 348/536 |

* cited by examiner

*Primary Examiner* — Lee Nguyen
(74) *Attorney, Agent, or Firm* — McClure, Qualey & Rodack, LLP

(57) ABSTRACT

Mobile communication devices and integrated circuits thereof are provided. The mobile communication device, communicating with a packet switched network and a second network, includes a transceiver, a first PLL circuit and a controller. When exchanging an ongoing data transmission with the packet switched network, the transceiver transmits a first message to the packet switched network, which indicates the mobile communication device will be tuned away from the packet switched network, and performs a subsequent procedure for the second network. The first PLL circuit provides a first clock to the transceiver. When the ongoing data transmission with the packet switched network is not completed, the controller controls the first PLL circuit to switch the first clock from a first clock frequency to a second clock frequency after the transceiver transmits the first indication message.

20 Claims, 11 Drawing Sheets

MOBILE COMMUNICATION DEVICE AND INTEGRATED CIRCUIT THEREOF

CROSS REFERENCE TO RELATED APPLICATIONS

This application claims priority of China Application No. 201310129748.7, filed on Apr. 15, 2013, and the entirety of which is incorporated by reference herein.

BACKGROUND OF THE INVENTION

1. Field of the Invention

The present invention relates to wireless communication, and in particular, to a mobile communication device for multimode communications and an integrated circuit thereof.

2. Description of the Related Art

Fourth generation (4G) communication technologies such as Long-Term Evolution (LTE), LTE-Advanced, and Worldwide Interoperability for Microwave Access (WiMAX) communication networks are packet-switched networks, which provide high-speed data services through Multiple Input Multiple Output (MIMO) technology, a multi-antenna technology which provides various modes of transmit diversity, large delay Cyclic Delay Diversity (CDD), multi-user MIMO and closed loop spatial multiplexing.

While the 4G communication technologies offer enhanced data throughput, legacy communication technologies such as second generation (2G) and third generation (3G) communication technologies are still in use due to their wider radio coverage. Therefore mobile phones supporting multimode communications such as 4G/2G or 4G/3G or 4G/3G/2G communications are in need.

Currently the multimode communications for the 4G and legacy communication technologies are provided by network operators by either simultaneous Voice and 4G (for example, SVLTE—simultaneous voice and LTE) or Circuit Switched Fall Back (CSFB). Both approaches require considerable efforts and costs from the network operators to upgrade the multimode communication supports into the network.

BRIEF SUMMARY OF THE INVENTION

A detailed description is given in the following embodiments with reference to the accompanying drawings.

An embodiment of a mobile communication device is provided, communicating with a packet switched network and a second network, comprising a transceiver, a first Phase-locked Loop (PLL) circuit and a controller. When exchanging an ongoing data transmission with the packet switched network, the transceiver is configured to transmit a first message to the packet switched network, which indicates the mobile communication device will be tuned away from the packet switched network, and perform a subsequent procedure for the second network. The first PLL circuit is configured to provide a first clock to the transceiver. The controller is configured to receive first and second received signals from the transceiver and transmit a first transmitted signal to the transceiver, and when the ongoing data transmission with the packet switched network is not completed, configured to control the first PLL circuit to switch the first clock from a first clock frequency to a second clock frequency after the transceiver transmits the first indication message.

Another embodiment of an integrated circuit is disclosed, adopted by a mobile communication device communicating with a packet switched network and a second network, comprising a transceiver, a first PLL circuit and a controller. When exchanging an ongoing data transmission with the packet switched network, the transceiver is configured to transmit a first message to the packet switched network, which indicates the mobile communication device will be tuned away from the packet switched network, and perform a subsequent procedure for the second network. The first PLL circuit is configured to provide a first clock to the transceiver. The controller is configured to receive first and second received signals from the transceiver and transmit a first transmitted signal to the transceiver, and when the ongoing data transmission with the packet switched network is not completed, configured to control the first PLL circuit to switch the first clock from a first clock frequency to a second clock frequency after the transceiver transmits the first indication message.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Various aspects are described herein in connection with a mobile communication device, which can also be referred to as a system, device, subscriber unit, subscriber station, wireless terminal, mobile station, mobile, mobile device, remote station, remote terminal, access terminal, user terminal, terminal, communication device, user agent, user device, or user equipment (UE). A mobile communication device may be a cellular telephone, a satellite phone, a cordless telephone, a Session Initiation Protocol (SIP) phone, Personal Digital Assistant (PDA), a handheld device having wireless connection capability, a computing device, or other processing device connected to a wireless modem.

It should be noted that, although the LTE network 12 and GSM network 14 are employed various embodiments of the invention to illustrate principles of multimode communication methods and multimode communication devices, any packet-switched network or 4G network may be adopted in place of the LTE network 12, any packet-switched or circuit switched network may be adopted in place of the GSM network 14. For example, the LTE network 12 may be replaced by a 4G or later generation of communication networks, such as an LTE-Advanced or WiMAX networks, the GSM network 14 may be replaced by a 2G, 3G, 4G or later generations of communication networks such as the Global System for Mobile Communications (GSM), Interim Standard 95 (IS-95), General packet radio service (GPRS), Enhanced Data rates for GSM Evolution (EDGE), Universal Mobile Telecommunications System (UMTS), Code Division Multiple Access 2000 (CDMA2000), cdma2000 1x, Enhanced Voice-Data Optimized (EVDO), Time Division-Synchronous Code Division Multiple Access (TD-SCDMA), High Speed Packet Access (HSPA), LTE, WiMAX, and LTE-Advanced networks. Hereinafter, a 2G network may be referred to as a GSM or IS-95 network; a 3G network may be referred to as a GPRS, EDGE, UMTS, CDMA2000, cdma2000 1x, EVDO, TD-SCDMA, or HSPA network; and a 4G network may be referred to as an LTE, WiMAX, or LTE-Advanced network.

Figure 1:
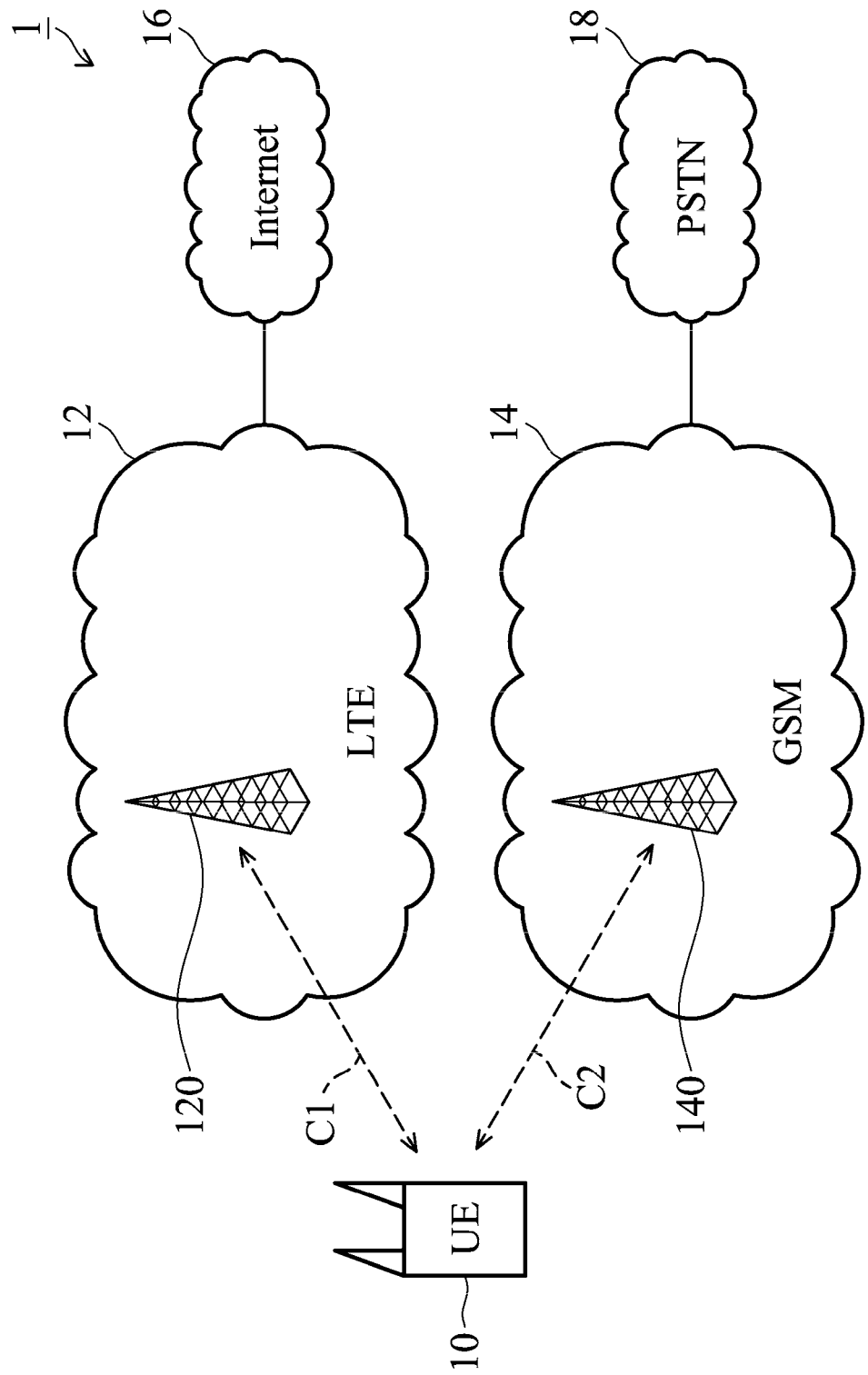
FIG. 1 shows a multimode communication environment 1 according to an embodiment of the invention.

FIG. 1 shows a multimode communication environment 1 according to an embodiment of the invention, including an LTE network 12 (packet switched network) and a GSM network 14 (second network) which may offer various LTE and GSM communication services to a UE 10 (mobile communication device) concurrently. The LTE network 12 may provide packet switching based services such as an internet data service to the UE 10 by accessing an Internet 16. The GSM network 14 may provide circuit switching based services such as a voice call to the UE 10 by accessing a Public Switched Telephone Network (PSTN) 18. The UE 10 can acquire both the LTE and GSM services concurrently by implementing multimode communication functionality into UE 10.

Specifically, the UE 10 is configured to establish an LTE connection C1 to the LTE network 12, and during a period when the LTE connection C1 remains connected, the UE 10 is configured to regularly or periodically tune away one antenna from the LTE network 12 to the GSM network 14, for performing a GSM communication service such as performing a registration to the GSM network 14, monitoring a paging message, originating a voice call, initiating a short message service, or performing other GSM services. After the GSM service is completed, the UE 10 is then configured to tune back to the LTE network 12 and proceed with unfinished LTE services or initiate new LTE services.

The UE 10 may be equipped with 2 antennas for the MIMO and the antenna diversity functions in the LTE technology. Correspondingly, the UE 10 implements two receiver paths (not shown) internally, coupled to the 2 antennas respectively. Two RF architectures for the UE 10 are considered in the disclosure in details: (1) a shared Phase-Locked Loop (PLL) for the 2 receiving RF paths in the UE 10, illustrated by FIG. 2; (2) Two separately PLLs for 2 receiver paths in the UE 10, and the two the receiving RF paths can be tuned to different RF frequency bands, depicted in FIG. 3.

Rather than implementing the multimode communication functionality from the service network, the UE 10 provides multimode communications at the end-user side, thereby decreasing network complexity, while being able to access two or more communication networks concurrently.

Figure 2:
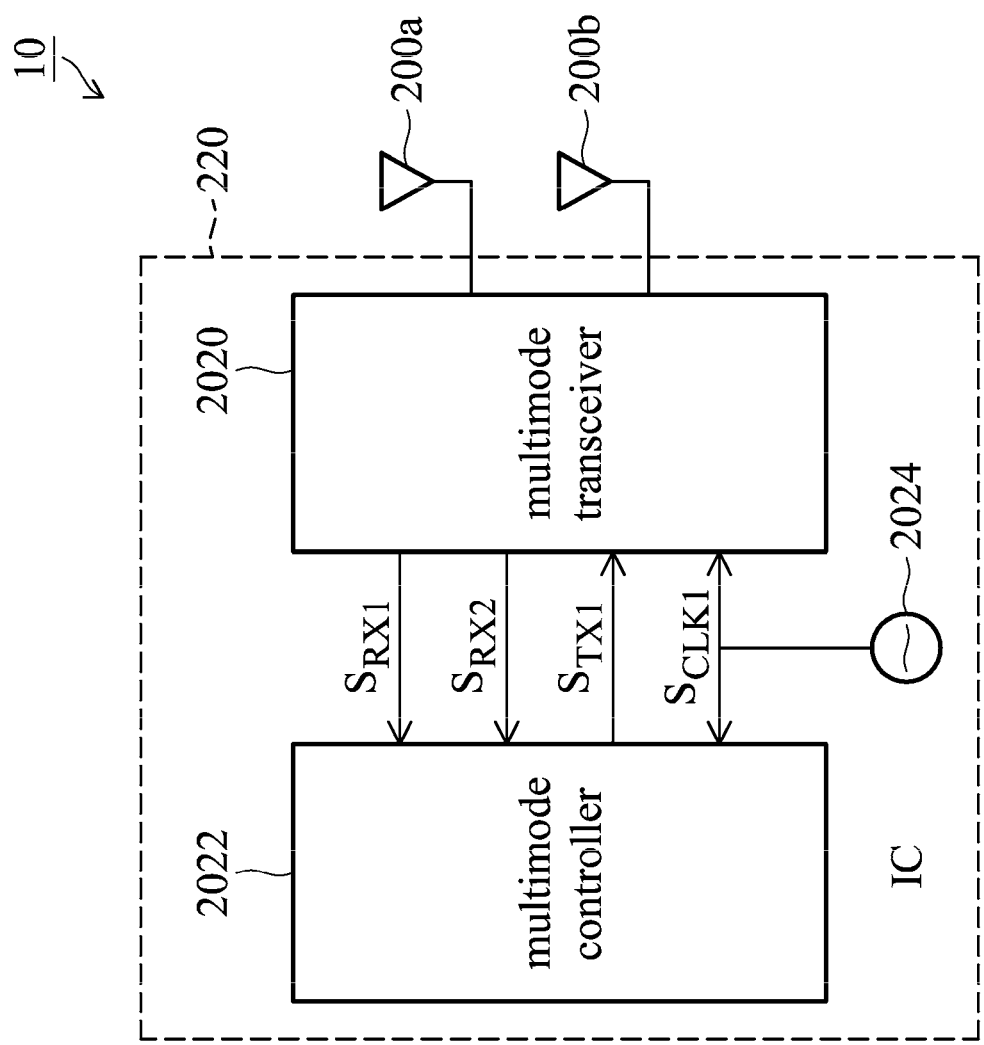
FIG. 2 is a block diagram of the UE 10 according to an embodiment of the invention.

FIG. 2 is a block diagram of the UE 10 in FIG. 1 according to an embodiment of the invention, including a first antenna 200*a*, a second antenna 200*b*, and an integrated circuit (IC) 202 which supports two wireless communication technologies with a shared Phase-Locked Loop (PLL) circuit. The integrated circuit 202 contains a 4G/3G/2G multimode transceiver 2020, a 4G/3G/2G multimode controller 2022, and a first PLL circuit 2024. The UE 10 is a hybrid wireless terminal which provides communication services for two or more wireless communication technologies. More specifically, the UE 10 is configured to concurrently adopt a packet switching based communication such as the 4G communication and a second communication which may be a packet or circuit switching based such as the 2G, 3G or 4G communication, thereby providing increased data throughput, increased radio coverage, and extended network flexibility.

The UE 10 includes one transmitter path and two receiver paths. The transmitter path passes along the multimode controller 2022, to the multimode transceiver 2020, and to the antennas 200*a* or 200*b*. The receiver paths pass along the antennas 200*a* or 200*b*, to the multimode transceiver 2020, and to the multimode controller 2022.

The UE 10 adopts the MIMO or the antenna diversity technology by delivering radio frequency (RF) signals via both the first and second antennas 200*a* and 200*b*. The 4G/3G/2G multimode transceiver 2020 performs various mixed signal and analog signal processing for the 2G, 3G or 4G communication technologies, such as Digital-to-Analog Conversion (DAC), Analog-to-Digital Conversion (ADC), up-conversion, down-conversion, amplification, and other filtering processes. The 4G/3G/2G multimode controller 2022 performs various baseband signal processing for the 2G, 3G or 4G communication technologies, such as digital modulation and demodulation, antenna diversity compensation, MIMO data recovery, and other baseband operations. The 4G/3G/2G multimode controller 2022 is configured to receive signals $S_{RX1}$ and $S_{RX2}$ from the 4G/3G/2G multimode transceiver 2020 and transmit a signal $S_{TX1}$ to the 4G/3G/2G multimode transceiver 2020.

The first PLL circuit 2024 may be shared by the multimode communication technologies, containing a crystal (not shown), and supplying a first clock signal $S_{CLK1}$ to the multimode transceiver 2020 and the multimode controller 2022 based on the communication technology being used. For example, the first clock signal $S_{CLK1}$ may operate at 900 MHz for the GSM network 14 in FIGS. 1, and 700 or 900 MHz for the LTE network 12 in FIG. 1. The first PLL circuit 2024 is configured to receive a control signal (not shown) from the multimode controller 2022 to determine a clock frequency for the first clock signal $S_{CLK1}$. For example, when the UE 10 is exchanging LTE data communication with the LTE network 12, the multimode controller 2022 is configured to control the first PLL circuit 2024 to tune the first clock signal $S_{CLK1}$ into an LTE operation frequency. When the UE 10 tunes away from the LTE network 12 to the GSM network 14, the multimode controller 2022 is configured to control the first PLL circuit 2024 to switch from the LTE operation frequency to a GSM operation frequency. In certain embodiments, when switching between different or multiple clock frequencies, the first PLL circuit 2024 requires certain time to settle down to the selected clock frequency.

The UE 10 operates in one of the three possible modes: a dual-standby mode where both the 4G and 2G/3G communications are in standby operation, a 3G/2G traffic mode where a voice or SMS is in operation, and a 4G LTE traffic mode where a 4G packet switched traffic is ongoing while monitoring a 2G/3G procedure such as paging, registration or SMS procedures.

In the hybrid dual-standby mode, depending on the wakenup paging slots predetermined for the LTE network 12 or GSM network 14, there may have overlapped waken-up intervals for the two networks. If there is a contention between the LTE network 12 and GSM network 14, the multimode controller 2022 in the UE 10 will select the higher priority system to monitor the paging. If the voice is important, the GSM network 14 will be configured with a higher priority than that of the LTE network 12, resulting in a higher priority in the paging monitoring for the GSM network 14 over the 4G LTE network 12. For the low priority network, depending on its state, it can be handled differently. a) If both the higher and the lower priority networks are in the monitoring state, the multimode controller 2022 of the UE 10 can either preempt the lower priority network, putting the lower priority network into a freeze mode and resuming its operations or activities after the higher priority system has finished its monitoring operation, or simply ignore and stop the operation of the lower priority network. b) If the lower priority network is in a sleeping state, instead of being waken up the and monitoring slot for the lower priority network, the multimode controller 2022 of the UE 10 can let the lower priority network continue to sleep until its next designated monitoring slot or ignore the lower priority network's wake up request until the higher priority system has finished its task. There are some other embodiments: (1) both of the receiver paths in the UE 10 are assigned to the LTE network 12 during being waken-up or assigned to the GSM network 14 during its wake-up depending on the wake-up slot. (2) Only one of the two receiver paths is assigned to the LTE network 12 during wake-up or to GSM network 14 during its wake-up depending on the wake-up slot.

In the 3G/2G traffic mode, one receiver path is assigned to the GSM communications. The other receiver path can be inactive or assigned to GSM communication as a diversity path.

In the 4G traffic mode, the two receiver paths are assigned to the LTE communications and will be tuned to the GSM network 14 during a GSM procedure such as the GSM monitoring, registration or SMS procedure. Before the receiver path is tuned to GSM network 14, the multimode transceiver 2020 of the UE 10 is configured to send a first message to inform the eNode B 120 that the UE 10 is tuning away so that the eNode B 120 can suspend the data transmission from LTE network 12. The indication can be physical layer signal, for example, a Channel Quality Information (CQI) set as 0, or the upper layer message, for example, a Reference Signal Received Power (RSRP) message with the reported values of RSRP__00 for either serving or serving and neighbor cells or a Reference Signal Received Quality (RSRQ) message with the reported values of RSRQ__00 for either serving or serving and neighbor cells or extended service request. Once the UE 10 sends the first message to the eNode B 120, the receiver path in the multimode transceiver 2020 will be tuned to the GSM network 14 network for monitoring the paging, originating a voice call, performing the registration, sending a short message service (SMS), or performing other GSM procedures. The multimode controller 2022 is configured to adjust parameters for the multimode transceiver 2020, which includes the frequency, bandwidth in compliance with GSM network 14. After the first PLL circuit 2024 and the multimode transceiver 2020 settle down, the UE 10 starts to acquire the GSM network 14 and perform the relevant GSM procedure. If the multimode controller 2022 needs send a GSM signal to a base station 120 (for example, sending a registration message), it can also send through the multimode transceiver 2020. After the GSM procedure has been completed, the multimode controller 2022 can adjust parameters including bandwidth, frequency of the multimode transceiver 2020 back to the LTE. After the first PLL circuit 2024 and the multimode transceiver 2020 settle down, the 4G network 12 can be acquired, the multimode controller 2022 sends a message to the eNode B 120 to resume the suspended data session and continue the pending packets. During the tune-away period for GSM network 14, the eNode B 120 will start the supervision timer and act as the poor link condition. The UE 10 can either resume the previous session and the pending packets transmission when the supervision timer doesn't expire or re-establish the data session when the supervision timer expires.

When exchanging an LTE data transmission with the LTE network 12, the UE 10 is configured to regularly or periodically tune away from the LTE network 12 to the GSM network 14. The multimode controller 2022 may include a tune-away timer (not shown) for counting a time for tuning to the GSM network 14. A tune-away period for the tune-away timer may be pre-defined. In some implementation, the tune-away period is associated with an anticipated GSM paging timing for the UE 10. When the tune-away timer expires, the multimode transceiver 2020 is configured to transmit a first message to the LTE network 12. The first message indicates the UE 10 will tune away from the LTE network 12 to the GSM network 14. Upon sending the first message, the multimode controller 2022 is configured to switch the first clock signal $S_{CLK1}$ from the LTE operation frequency (first clock frequency) to the GSM operation frequency (second clock frequency), and perform a subsequent procedure for the GSM network 14. In some embodiments, only one of the antennas 200a and 200b is tuned away and used for conducting the subsequent procedure with the GSM network 14, the other antenna is unused during the GSM procedure. In other embodiments, both antennas 200a and 200b are used for the subsequent GSM procedure. The first message may be a physical layer message, such as a CQI being 0, or an upper layer message. For example, the upper layer message may be a Reference Signal Received Power (RSRP) message with the reported values of RSRP__00 for either serving or serving and neighbor cells in the LTE network 12, or a Reference Signal Received Quality (RSRQ) message with the reported values of RSRQ__00 for either serving or serving and neighbor cells in the LTE network 12 for an extended service request. After the subsequent procedure for the GSM network 14 has been completed, the UE 10 is configured to tune back from the GSM network 14 to the LTE network 12 and resume or restart the LTE data transmission.

It should be noted that, although FIG. 2 shows the multimode transceiver 2020 and the multimode controller 2022 are supplied by the identical first clock signal $S_{CLK1}$, in some implementations, the multimode transceiver 2020 and the multimode controller 2022 are supplied with clock signals at different frequencies. For example, for the GSM system, the first PLL circuit 2024 may supply a clock signal $S_{clk1}'$ with a 900 MHz clock frequency to the multimode transceiver 2020, and supply a clock signal $S_{clk1}''$ with a baseband clock frequency to the multimode controller 2022.

The UE 10 in FIG. 2 employs a shared PLL circuit to provide multimode communications at the user-end side, rendering decreased network infrastructure complexity and accesses to two or more communication networks.

Figure 3:
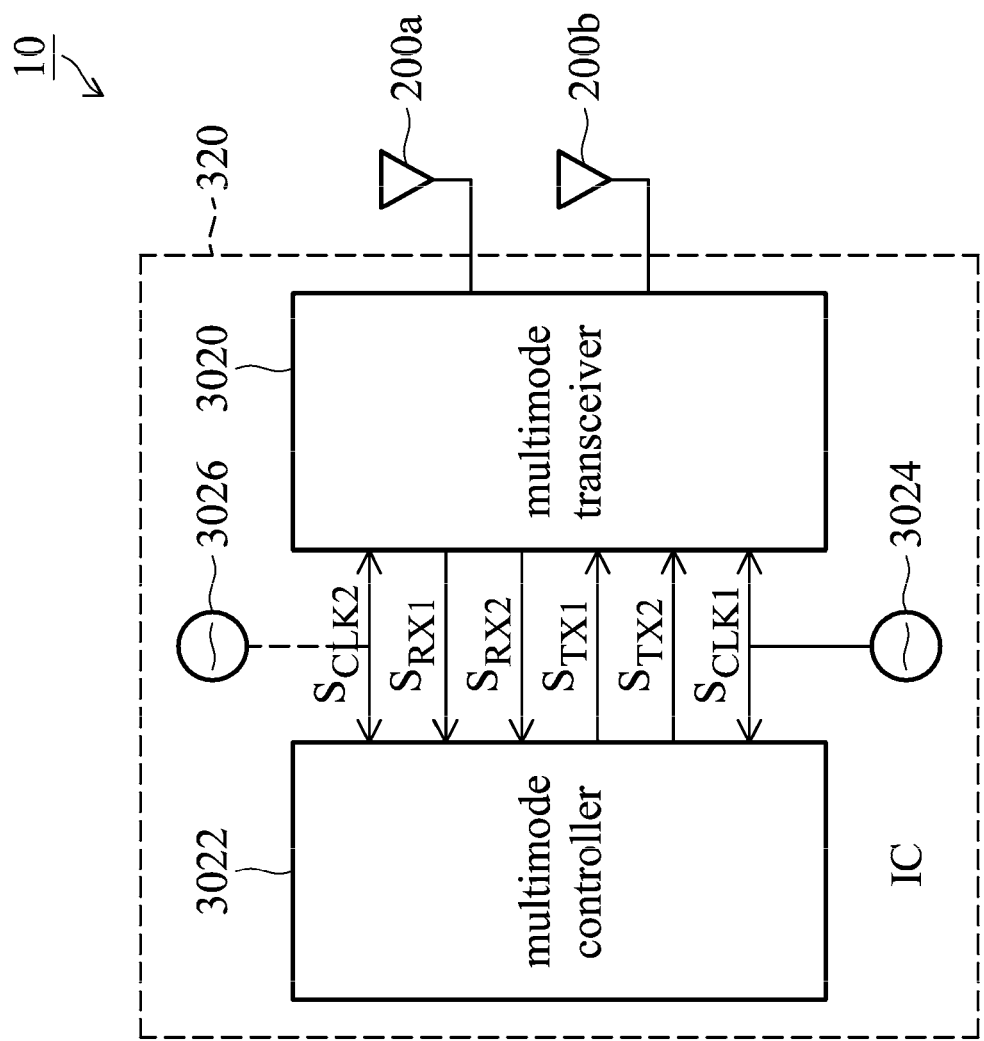
FIG. 3 is a block diagram of the UE 10 according to another embodiment of the invention.

FIG. 3 is a block diagram of the UE 10 according to another embodiment of the invention, including a first antenna 200a, a second antenna 200b, and an integrated circuit 302 which supports two wireless communication technologies with two separate PLL circuits. The integrated circuit 302 contains a 4G/3G/2G multimode transceiver 3030, a 4G/3G/2G multimode controller 3022, and first and second PLL circuits 3024 and 3026.

The UE 10 in FIG. 3 is distinct from the UE 10 in FIG. 2 in that two separate PLL circuits 3024 and 3026 are used, allowing for communications to the LTE network 12 and the GSM network concurrently. Further, the UE 10 in FIG. 3 is also different from the UE in FIG. 2 in that 2 transmitter paths are provided.

The UE 10 also operates in one of the three possible modes: the dual-standby mode where both the 4G and 2G/3G communications are in standby operation, the 3G/2G traffic mode where a voice or SMS is in operation, and the 4G LTE traffic mode where a 4G packet switched traffic is ongoing while monitoring a 2G/3G procedure such as paging, registration or SMS procedures.

In dual-standby mode, when the UE 10 is required to be waken up for monitoring the LTE network 12 and the GSM network 14, one receiver path of the UE 10 is assigned to the LTE monitoring procedure and the other receiver path is assigned to the GSM monitoring procedure. There are some other embodiments: (1) both the receiver paths are assigned to LTE communications during the UE 10 wakes up and one receiver path is tuned away for the GSM communications depending on the GSM wake-up slot. (2) each communication technology is assigned to a dedicated receiver path, i.e., one receiver paths is assigned to LTE communications during wake-up and the other receiver path is assigned to 3G/2G (3G or 2G) during wake-up.

In the 3G/2G traffic mode, one receiver path is assigned to the GSM communications. The other receiver path can be inactive or assigned to GSM communication as a diversity path.

In 4G traffic mode, 2 receiver paths are assigned to the LTE communications while one of the 2 receiver paths is tuned away to the GSM network 14 during a GSM procedure such as 3G/2G monitoring, registration, SMS or other GSM procedures. Before the receiver path is tuned away to the GSM network 14, the UE 10 sends a second message to the eNode B 120 to suspend the MIMO data transmission from the LTE network 12, indicating only one of the antennas 200a and 200b is used for the LTE data transmission. The second message may be a physical layer signal, for example, Rank Indication RI set to 1, or an upper layer message. Once the UE 10 sends an indication to the eNode B 120, one of the receiver paths will be tuned to the GSM network 14 for monitoring the paging, originating a voice call, performing the registration, sending a SMS, or performing other GSM procedures. The multimode controller 3022 adjusts parameters for the multimode transceiver 3020, including the bandwidth, frequency which complies with the GSM network 14. After the multimode transceiver 3020 and PLL circuits settle down, the UE 10 is configured to acquire the GSM network 14 and perform the GSM procedure. If the multimode controller 3022 further needs to send GSM signal to base station 140 (for example, sending a registration message or SMS), the UE 10 is configured to send a first message to the eNode B 120 to suspend the data transmission from 4G network, indicating both antennas 200a and 200b will be tuned away from the LTE network 12. The first message may be a physical layer message, such as a CQI being 0, or an upper layer message. For example, the upper layer message may be a Reference Signal Received Power (RSRP) message with the reported values of RSRP__00 for either serving or serving and neighbor cells in the LTE network 12, or a Reference Signal Received Quality (RSRQ) message with the reported values of RSRQ__00 for either serving or serving and neighbor cells in the LTE network 12 for an extended service request.

Once the UE 10 sends the first message to the eNode B 120, the transmission path in the multimode transceiver 3020 will be tuned to the GSM network 14 for originating a voice call, performing the registration or sending SMS. After the GSM traffic finishes using multimode transceiver 3020, the multimode controller 3022 adjusts parameters, including wideband, frequency for multimode transceiver 3020, to comply with the LTE network 12. After the multimode transceiver 3020 and PLL circuits settle down and the 4G network is acquired, the multimode controller 3022 sends a third message to the eNode B 120 to resume the suspended data session. During the tune-away period for GSM network 14, the eNode B 120 will start the supervision timer and act as the poor link condition. UE 10 can either resume the previous session and the pending packets transmission when the supervision timer doesn't expire or re-establish the data session when the supervision timer expires.

The UE 10 in FIG. 3 employs separate PLL circuits to provide communications for LTE and GSM systems concurrently from the end-user side, rendering decreased network infrastructure complexity and concurrently accesses to two or more communication networks.

Figure 4A:
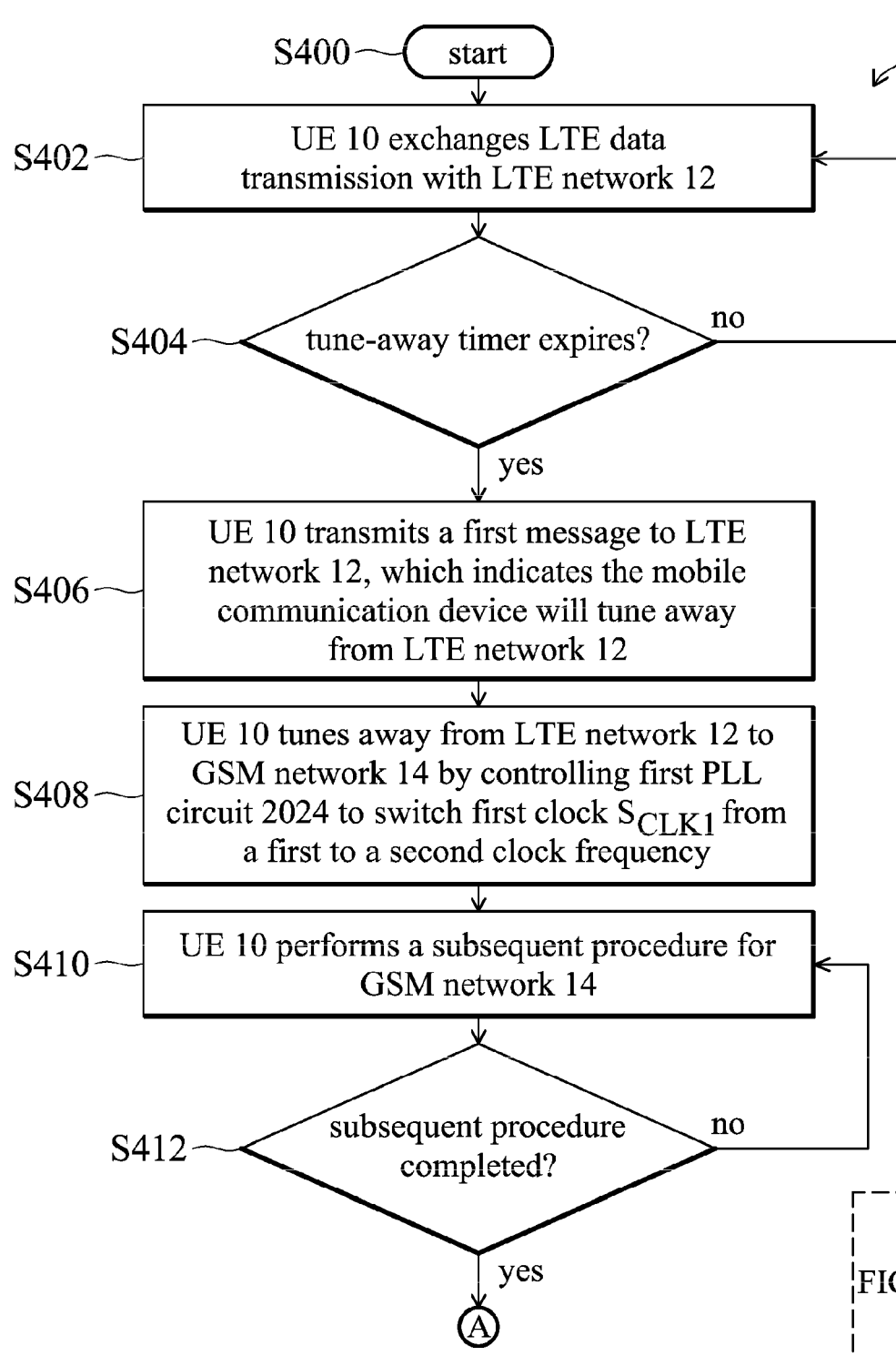
FIGS. 4A and 4B collectively show a flowchart of a multimode communication method 4 according to an embodiment of the invention.
Figure 4B:
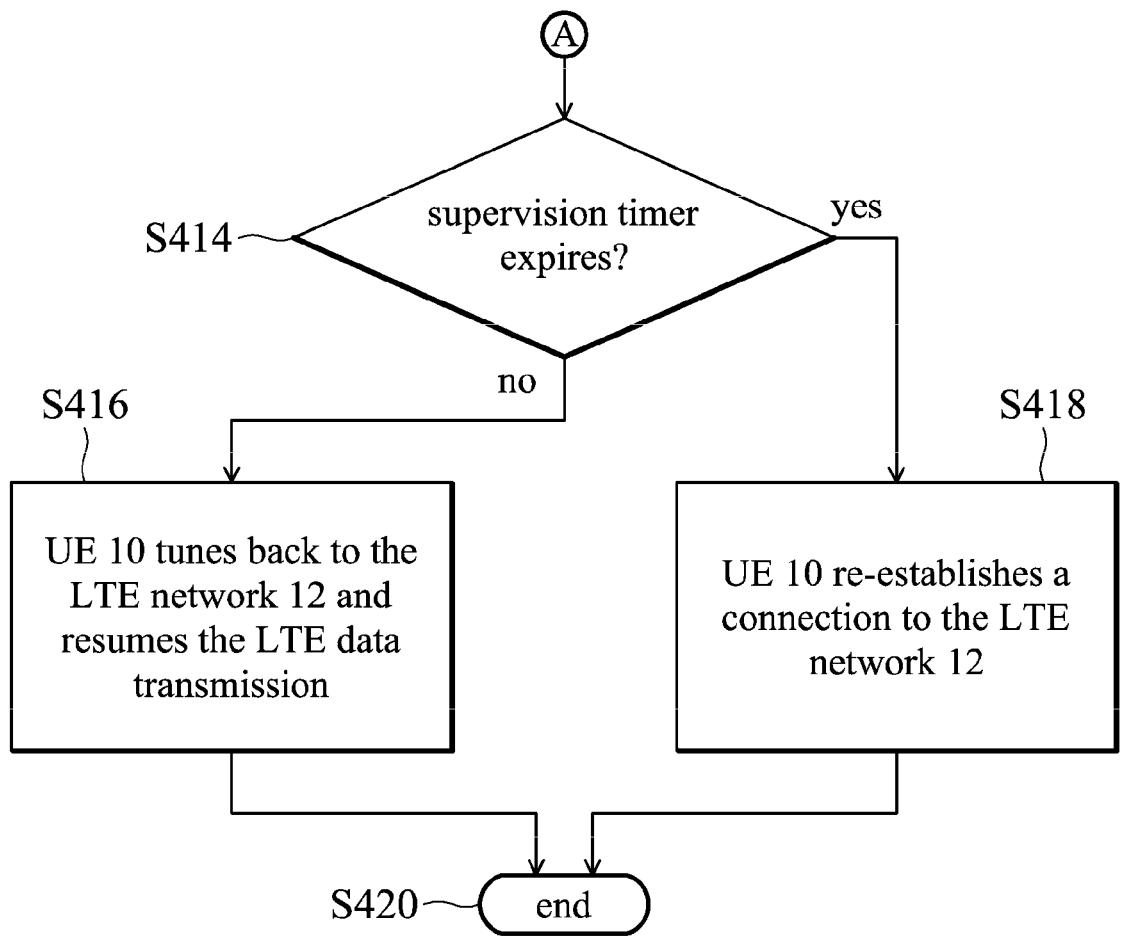

FIGS. 4A and 4B (also collectively referred to as "FIG. 4") show a flowchart of a multimode communication method 4 according to an embodiment of the invention, incorporating the UE 10 in FIG. 2 and the multimode communication environment 1 in FIG. 1.

Upon startup, the UE 10 has registered into the LTE network 12, ready for accessing the LTE network 12 (S400). The UE 10 is then configured to establish the connection C1 with the LTE network 12 and exchange LTE data transmission with the LTE network 12 (S402). The LTE data transmission may be an uplink or a downlink transmission. During the LTE data transmission, the tune-away timer is activated. The multimode controller 2022 regularly checks and determines whether the tune-away timer has expired (S404). When the tune-away timer has not expired, the UE 10 is configured to continue the ongoing LTE data transmission with the LTE network 12 (S402). When the tune-away timer has expired, the UE 10 is configured to be tuned away from the LTE network 12 to the GSM network 14 (S406).

In Step S406, the UE 10 transmits a first message to the LTE network 12, to inform the LTE network 12 that the UE 10 will be tuned away from LTE network 12. In some embodiments, the UE 10 is configured to wait until receiving an acknowledgement message for the first message from the LTE network 12. In other embodiments, the UE 10 is configured to carry on the next step S408 upon sending the first message. The first message may be a physical layer message, such as a CQI being 0, or an upper layer message being a predefined value. For example, the upper layer message may be a Reference Signal Received Power (RSRP) message with the reported values of RSRP__00 for either serving or serving and neighbor cells in the LTE network 12, or a Reference Signal Received Quality (RSRQ) message with the reported values of RSRQ__00 for either serving or serving and neighbor cells in the LTE network 12 for extended service request. After receiving the first message, the LTE network 12 may act as if a poor link condition has been reported, and initiate a network supervision timer for counting a supervision period. When the supervision timer expires, the LTE connection C1 will be disconnected. The UE 10 may also set up a UE supervision timer at the multimode controller 2022, activating the UE supervision timer upon transmitting the first message.

After sending the first message to the LTE network 12, the UE 10 is configured to suspend the LTE data transmission and tune away from the LTE network 12 to the GSM network 14 by controlling the first PLL circuit 2024 to switch the first clock $S_{CLK1}$ from the LTE operation frequency to the GSM operation frequency (S408). The first PLL circuit 2024 may require some time to settle down to a stable GSM clock frequency.

After the first clock $S_{CLK1}$ settles at the GSM clock frequency, the UE 10 is configured to perform the subsequent procedure for the GSM network 14, such as performing a registration to the GSM network 14, monitoring a paging message, originating a voice call, initiating a short message service, or performing other GSM services (S410). For example, the UE 10 may switch to the GSM network 14 for detecting a paging message on a paging channel.

Next, the UE 10 is configured to determine whether the subsequent procedure for the GSM network 14 has been completed (S412). When the subsequent procedure has not yet been completed, the UE 10 is configured to return to step S410 for continuing the subsequent procedure. When the subsequent procedure has been completed, the UE 10 is configured to tune back to the LTE network 12 and determine whether the supervision timer has expired (S414).

When the supervision timer has not yet expired, the UE 10 is configured to resume the suspended LTE data transmission (S416), otherwise, the supervision timer has expired, the UE 10 is configured to re-establish a connection to the LTE network 12 (S418).

The multimode communication method 4 employs a UE with a shared PLL circuit, providing multimode communications by the UE, while reducing network infrastructure complexity.

Figure 5A:
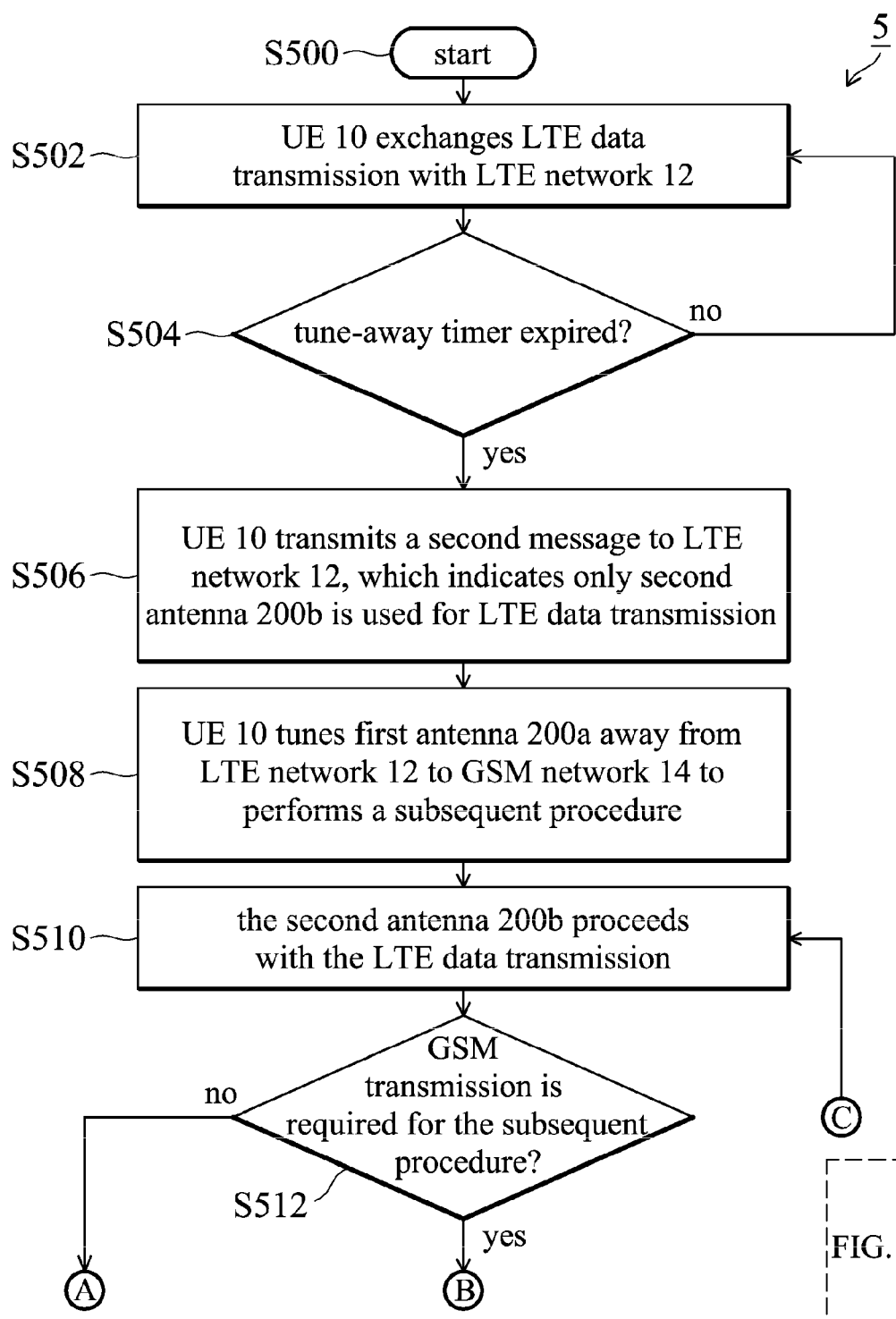
FIGS. 5A and 5B collectively show a flowchart of a multimode communication method 5 according to another embodiment of the invention.
Figure 5B:
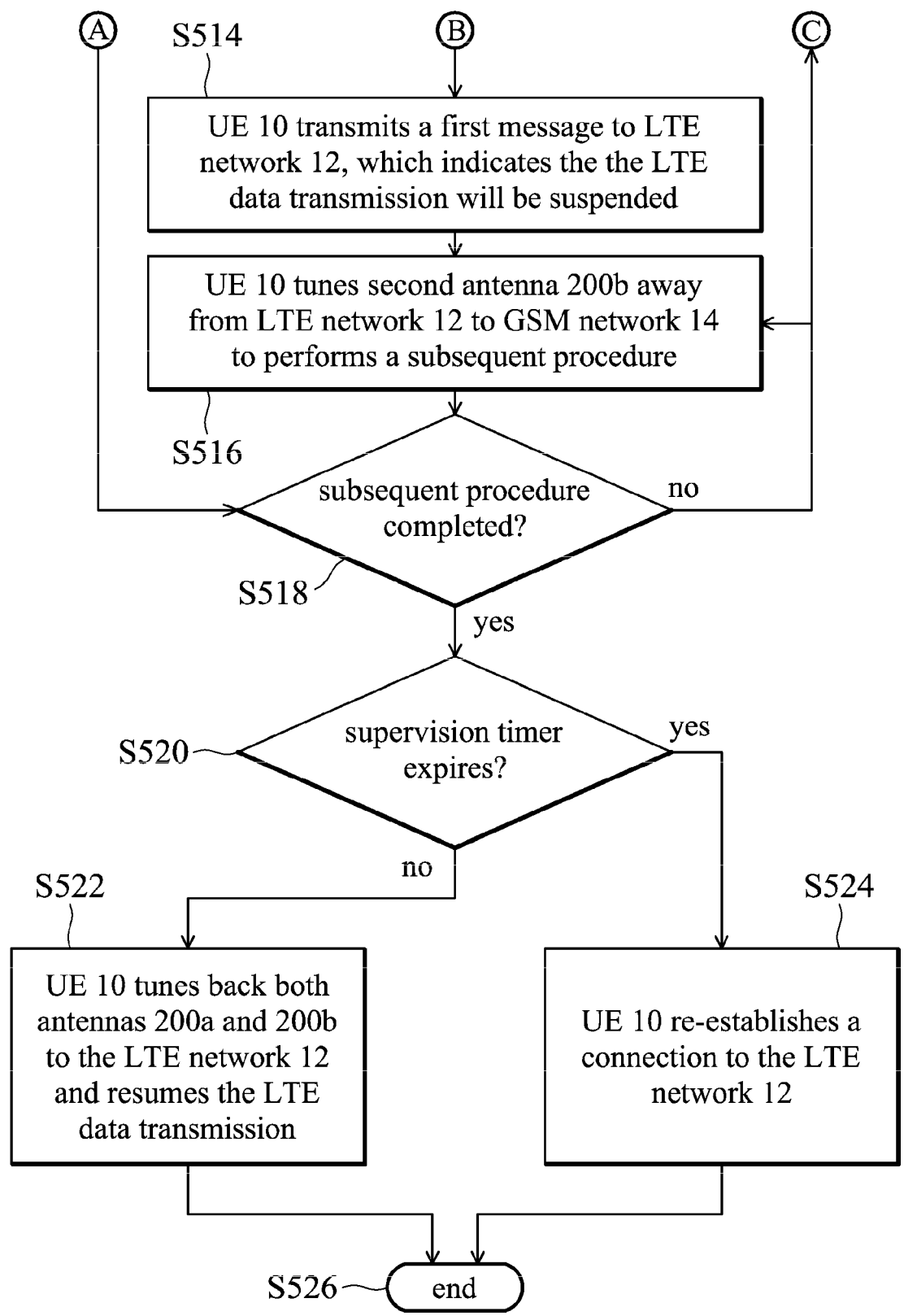

FIGS. 5A and 5B (also collectively referred to as "FIG. 5") show a flowchart of a multimode communication method 5 according to another embodiment of the invention, incorporating the UE 10 in FIG. 3 and the multimode communication environment 1 in FIG. 1. The UE 10 in FIG. 3 utilizes the PLL circuits 3024 and 3026 for generating the first and second clock signals $S_{CLK1}$ and $S_{CLK2}$, therefore, when tuning away from the LTE network 12 to the GSM network, the UE 10 may assign a clock signal to the LTE network 12 and the GSM network 14 each, so that the LTE and GSM procedures may be performed on the UE 10 concurrently.

Upon startup, the UE 10 has registered to the LTE network 12 and is ready for accessing the LTE network 12 (S400). The first and second PLL circuits 3024 and 3026 are tuned to generate the first and second clock signals $S_{CLK1}$ and $S_{CLK2}$ at the LTE operation frequency. The Steps S502 and S504 are identical to the Steps S402 and S404, the explanation therefor can find reference in the preceding paragraphs and will be omitted here for brevity.

In Step S506, when the tune-away timer has expired, one of the antennas 200a and 200b is configured to be tuned away from the LTE network 12 to the GSM network 14, while the other antenna remains tuning to the LTE network 12. The UE 10 is configured to transmit a second message to the LTE network 12, which indicates the MIMO function on the UE 10 is disabled, and only the second antenna 200b is used for the LTE data transmission (S506). The second message may be a physical layer signal, such as a Rank Indication set to 1, or an upper layer message.

Once the UE10 sends the second message to the LTE network 12, the UE 10 is configured to tune the antenna 200a away from the LTE network 12 to the GSM network 14 (S508). The multimode controller 3022 is configured to control the PLL circuit and 3026 to switch the first clock signal $S_{CLK1}$ from the LTE operation frequency to the GSM operation frequency, which in turn is fed to one of the RF paths in the multimode transceiver 3020, tuning the corresponding RF path and the antenna 200a to the GSM network 14 for performing the subsequent procedure including registering to the GSM network 14, monitoring a paging message, originating a voice call, initiating a short message service, or performing other GSM services. Correspondingly, the multimode controller 3022 is configured to adjust parameters for the multimode transceiver 3020 for generating the RF signal compliant with the GSM network 14.

Concurrently, the other antenna 200b remains tuning to the LTE network 12 and proceeds with the LTE data transmission (S510).

Next, the multimode controller 3022 is configured to determine whether a GSM transmission is required for the GSM subsequent procedure (S512). If so, the UE 10 is required to suspend the ongoing LTE data transmission and tune away the antenna 200b to the GSM network 14, thus continuing to Step S514. When a GSM transmission is not required, the multimode communication method 5 can be directed to Step S518.

In Step S514, when the GSM transmission is required for the GSM procedure, the UE 10 is configured to transmit a first message to LTE network 12, which indicates the UE 10 will tune away from the LTE system 12 and suspend the ongoing LTE data transmission. The first message may be a physical layer message, such as a CQI being 0, or an upper layer message. For example, the upper layer message may be a Reference Signal Received Power (RSRP) message with the reported values of RSRP_00 for either serving or serving and neighbor cells in the LTE network 12, or a Reference Signal Received Quality (RSRQ) message with the reported values of RSRQ_00 for either serving or serving and neighbor cells in the LTE network 12 for an extended service request.

After issuing the first message to the LTE network 12, the UE 10 can tune the second antenna 200b away from LTE network 12 to GSM network 14, performing the GSM transmission for the GSM subsequent procedure.

Steps S520 through S526 cover the procedures which the UE 10 will take to return to the LTE network 12 after the GSM subsequent procedure is completed. Steps S520 through S526 are identical to Steps S414 through S420 in FIG. 4, explanation therefore can find reference in the preceding paragraphs and will be omitted here for brevity.

The multimode communication method 5 employs a UE with two PLL circuits, providing concurrent multimode communications by the UE, while reducing network infrastructure complexity.

In LTE, an UE may be configured to transmit downlink channel measurement report including CQI, PMI, and RI back to the eNB to aid in scheduling, resource allocation, and link adaptation. The CQI report is carried by PUCCH or PUSCH.

In LTE, the UE monitors control signaling for downlink scheduling assignments related to paging. The UE wakes up briefly in a UE-specific paging cycle. If the UE detects a group identity used for paging (the P-RNTI) when it wakes up, it will process the corresponding downlink paging message transmitted on the PCH. The paging message includes the identity of the terminal being paged. A UE not finding its identity, or an international mobile subscriber identity (IMSI), will discard the received information and sleep according to the DRX cycle.

Figure 6:
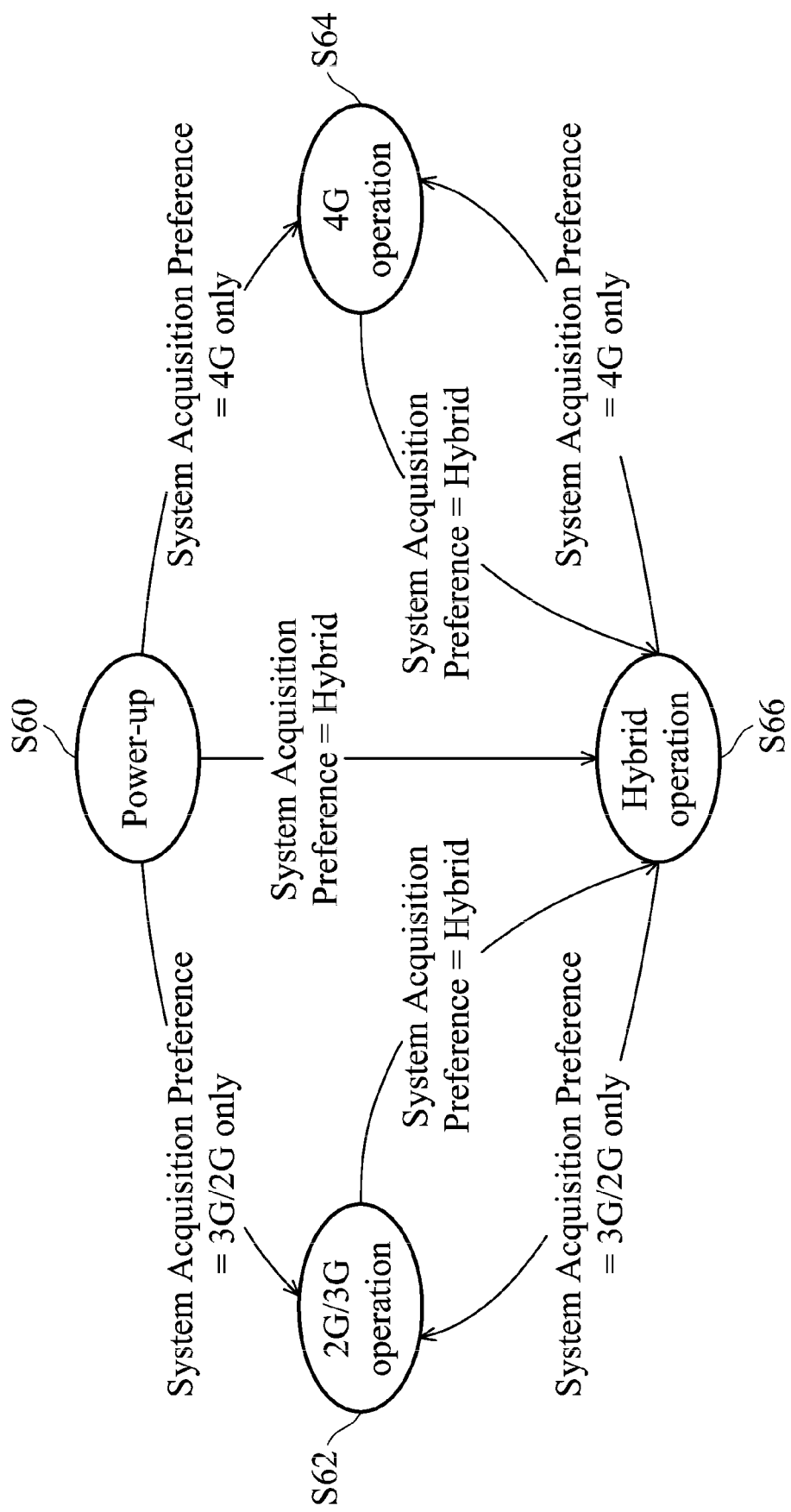
FIG. 6 is a state diagram of a multimode communication method 6 according to an embodiment of the invention.

FIG. 6 is a state diagram of a multimode communication method 6 according to an embodiment of the invention, incorporating the UE 10 in FIG. 2 or FIG. 3. Upon power-up, the UE 10 adopts one of three communication modes including a 4G operation mode, a 2G/3G operation mode, and a hybrid operation mode. The hybrid operation mode is a mode which the UE 10 can communicate with a 4G network and the 2G/3G network concurrently, the multimode communication methods described in FIGS. 4 and 5 are performed under the hybrid operation mode.

After power-up, the UE 10 is configured to determine a configuration of a System Acquisition Preference parameter (S60). If the System Acquisition Preference indicates "3G/2G Only", the UE 10 shall move to a 3G/2G state S62 and shall comply with the 3G/2G operations specified in a corresponding 3G/2G standard, such as a IS-2000 1x/HRPD standard. The details for the operations in 3G/2G operation mode are not covered in this disclosure. If the System Acquisition Preference indicates "4G Only", the UE 10 shall move to a 4G state S64 and shall comply with 4G operations specified in a 4G standard. The details for the operations in 4G operation mode are not covered in this disclosure. If System Acquisition Preference indicates "Hybrid", the UE 10 shall proceed to the hybrid state S66 and shall comply with the hybrid operations specified in the disclosure.

When the UE 10 is in 4G state S64, and System Acquisition Preference is changed to "Hybrid", the UE 10 shall transit into the hybrid state S66 and shall comply with the hybrid operations specified in the disclosure. When the UE 10 is in 3G/2G state S62, and System Acquisition Preference is changed to "Hybrid", the UE 10 shall transit into the hybrid state S66 and shall comply with the hybrid operations specified in the disclosure.

When the UE 10 is in Hybrid state S66, and System Acquisition Preference is changed to "3G/2G Only", the UE 10 shall transit into the 3G/2G state S62 and shall comply with the 3G/2G operations specified in the corresponding 3G/2G standard. When the UE 10 is in Hybrid state S66, and System Acquisition Preference is changed to "4G Only", the UE 10 shall transit into the 4G state S64 and shall comply with the 4G operations specified in the 4G 3G/2G standard.

Figure 7:
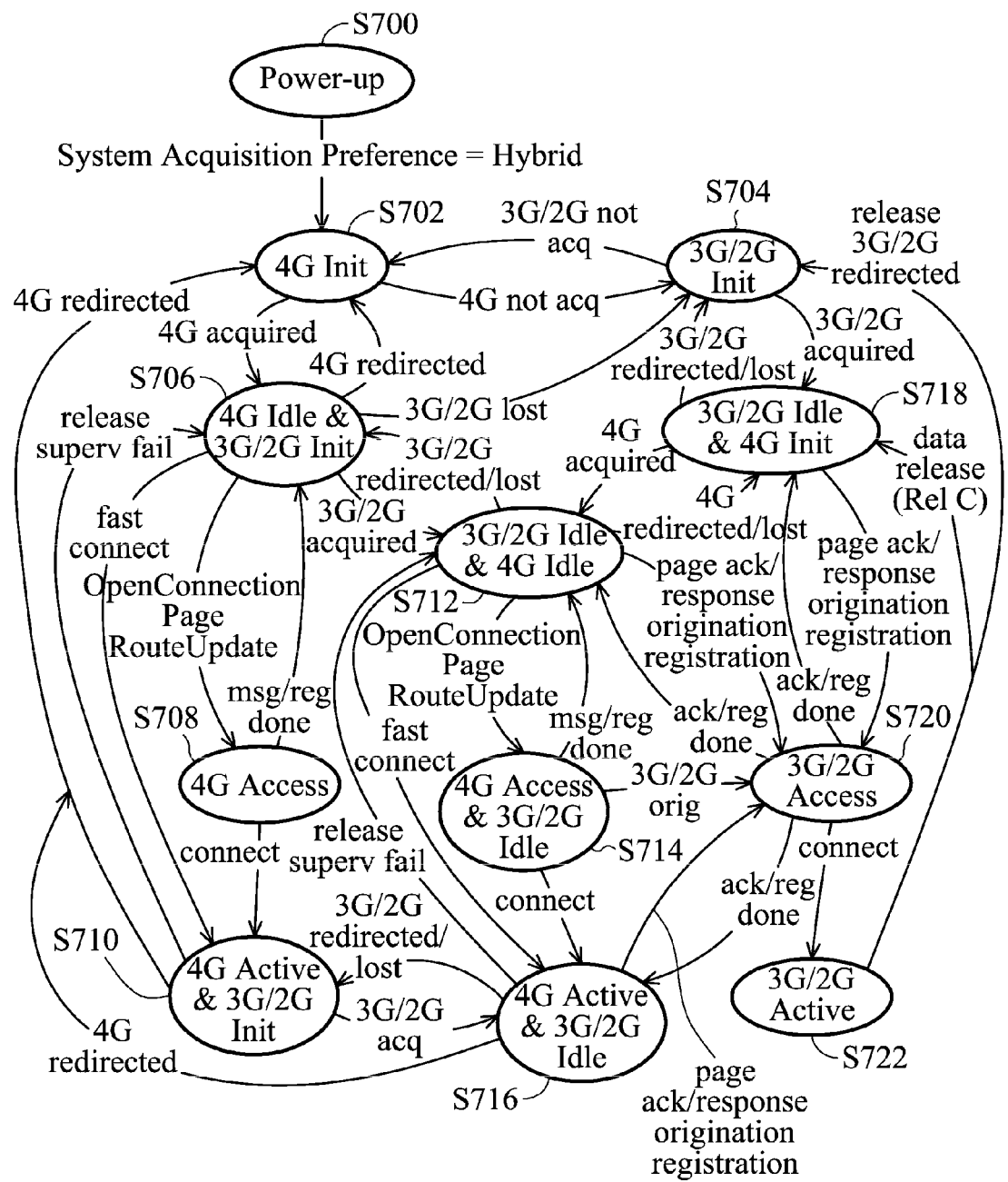
FIG. 7 is a state diagram of a hybrid multimode method 7 according to another embodiment of the invention.

FIG. 7 is a state diagram of a hybrid multimode method 7 according to another embodiment of the invention, incorporating the UE 10 in FIG. 2 and the multimode communication environment 1 in FIG. 1. Accordingly, the UE 10 adopts a shared PLL circuit for two receiving RF paths. The states in the state diagram FIG. 7 are affiliated according to an acquired 4G and 3G/2G state (Init, Idle, Access or Active). In the following description, a 4G or a CDMA system may refer to the LTE network 12 in FIG. 1, the 2G/3G system may refer to the GSM network 14 in FIG. 1.

After power-up, the UE 10 is configured to be initiated at State S700. According to the explanation for FIG. 6, the UE 10 shall operate in one of the following modes: the 4G (CDMA) operation mode, the 2G/3G (legacy) operation mode, and the hybrid operation mode. FIG. 7 shows a state diagram for the UE 10 to operate by the hybrid operation mode, with the LTE network 12 being selected as the primary system. The UE 10 is configured to determine a configuration of the System Acquisition Preference parameter. When the System Acquisition Preference indicates "3G/2G Only", the UE 10 shall operate in the 3G/2G operation mode and shall comply with the 3G/2G operations specified in a corresponding 3G/2G standard, such as the IS-2000 1x/HRPD standard. The details for the operations in 3G/2G operation mode are not covered in this disclosure. When the System Acquisition Preference indicates "4G Only", the UE 10 shall move to a 4G operation mode and shall comply with 4G operations specified in a 4G standard. The details for the operations in 4G operation mode are not covered in this disclosure. If the System Acquisition Preference indicates "Hybrid", the UE 10 shall proceed to the hybrid operation mode, entering State 702.

In State S702, the UE 10 is configured to start 4G system initialization (4G Init) by performing a 4G initialization procedure on the 4G system based on network parameters such as a Preferred Roaming List (PRL), Public Land Mobile Network (PLMN), MMSS Location Associated Priority List (MLPL) and Multiprotocol Label Switching (MPLS) according to the 4G standard. If the 4G system is acquired, the UE 10 shall transit to 4G Idle & 3G/2G Init State S706 to acquire the 3G/2G system. If the 4G acquisition fails after repeated trials, the UE 10 shall transit to 3G/2G Init State S704 to start 3G/2G system acquisition. If both the 4G and 3G/2G acquisitions fail after several attempts, the UE 10 should go to deep sleep to save power. It should be note that the operations in 4G Init state S702 is dependent on the system selection requirement.

When the System Acquisition Preference is Hybrid and the Hybrid Preference prefers 3G/2G, the UE 10 shall start 3G/2G system initialization by transitioning to 3G/2G Init State S704. In 3G/2G Init State S704, the UE 10 is configured to perform the 3G/2G initialization operation on the 3G/2G system based on PRL according to the 3G/2G standard such as the HRPD and IS-2000 standards. If the 3G/2G system is acquired, the UE 10 shall transit to 3G/2G Idle & 4G Init State S718 to acquire the 4G system. If the 3G/2G acquisition fails after repeated trials, the UE 10 shall transit to 4G Init State S702 to start 4G system acquisition. If both the 4G and 3G/2G acquisitions fail after several attempts, the UE 10 should go to deep sleep to save power. It should be note that the operations in 3G/2G Init State S704 is dependent on the system selection requirement and is subject to change.

In 4G Idle & 3G/2G Init State S706, the UE 10 is configured to perform idle operation on the 4G system according to a 4G standard and shall periodically search for the 3G/2G system according to PRL based on the HRPD standard. If the 3G/2G system is acquired, the UE 10 shall transit to 4G Idle & 3G/2G Idle State S712. If the 3G/2G acquisition fails after repeated trials, the UE 10 stays in the current state and should reduce the 3G/2G acquisition frequency to save power consumption. If the 4G system is lost or is re-directed, the UE 10 shall transit to 3G/2G Init State S704 to start the 3G/2G acquisition. If there is a fast connection, the UE 10 shall transit to 4G Active & 3G/2G Init State S710 according to the 3G/2G standard.

In 3G/2G Idle & 4G Init State S718, the UE 10 is configured to perform 3G/2G idle operation on the 3G/2G system according to 3G/2G standard and shall periodically search for the 4G system according to the PRL, PLMN, MLPL and MSPL. If the 4G system is acquired, the UE 10 shall transit to 4G Idle & 3G/2G Idle State S712. If the 4G acquisition fails after repeated trials, the UE 10 stays in the current state and should reduce the 4G acquisition frequency to save power consumption. If the 3G/2G system is re-directed, the UE 10 shall transit to 3G/2G Init State S704. If the 3G/2G system is lost, the UE 10 shall transit to 3G/2G Init State S704. If the following conditions occur, the UE 10 shall transit to the 3G/2G Access State S720, the condition may be 3G/2G call origination, 3G/2G paging, 3G/2G ACK/response, or 3G/2G registration.

In 4G Idle & 3G/2G Idle State S712, the UE 10 is configured to perform idle operation on both the 4G system and 3G/2G system according to respective standards. The 4G CDMA slot cycle is a function of International Mobile Subscriber Identity (IMSI) of the UE 10. The 4G slot cycle shall be chosen so it does not conflict with the 3G/2G slot location. If the 4G system is lost or is re-directed, the UE 10 shall transit to 3G/2G Idle & 4G Init State S718 to start the 4G acquisition. If the 3G/2G system is lost or is re-directed, the UE 10 shall transit to 4G Idle & 3G/2G Init State S706 to start HRPD acquisition. If there is fast connection, the UE 10 shall transit to 4G Active & 3G/2G Idle State S716.

In 3G/2G Access State S720, the UE 10 is configured to perform the system access operation on the 3G/2G system according to the 3G/2G standard. If the 3G/2G Access State S720 is completed without requiring setting up the traffic channel, it shall transit back to the state where it originated the access operation (3G/2G Idle & 4G Init State S718, or 4G Idle & 3G/2G Idle State S712, or 4G Active & 3G/2G Idle State S716. If the UE 10 is connected to the 3G/2G traffic channel, it shall transit to 3G/2G Active State S722.

In 4G Access & 3G/2G Idle State S714, the UE 10 is configured to perform the access channel MAC protocol operation on the 4G CDMA system according to 4G CDMA standard. If the 4G Access State S708 is completed without requiring setting up the traffic channel, it shall transit back to 4G Idle & 3G/2G Idle State S712. If the UE 10 is required to set up a 4G traffic channel, it shall transit to 4G Active & 3G/2G Idle State S716 to set up a traffic channel according to the 4G standard.

In 4G Access State S708, the UE 10 is configured to perform the following state transitions. If the 4G Access State is completed without requiring setting up the traffic channel, it shall transit back to 4G Idle & 3G/2G Init State. If the UE 10 is connected to a 4G traffic channel, it shall transit to 4G Active &3G/2G Init State.

In 3G/2G Active State S722, the UE 10 is configured to perform the traffic state operation on the 3G/2G system according to the 3G/2G standard. If the 3G/2G traffic channel is released, it shall transit to the 3G/2G Init State S704 to start the 3G/2G system initialization.

In 4G Active & 3G/2G Idle State S716, the UE 10 is configured to perform the traffic state operation on the 4G system according to the 4G standard and periodically perform the idle operation on the 3G/2G system according to the 3G/2G standard. In State S716, the UE 10 shall periodically switch to the 3G/2G radio network to monitor the 3G/2G common channels and tune back to the 4G network to resume the active data service. Before tuning to monitor 3G/2G system, UE 10 has to send indication CQI=0 to inform eNodeB 120 that the UE 10 is tuning away. If the 4G system is lost, it shall transit to 4G Init & 3G/2G Idle State S718 to re-acquire the 4G system according to PRL, PLMN, MLPL and MSPL. If the 4G traffic channel is released, it shall transit to 4G Idle & 3G/2G Idle State S712. If the 4G traffic channel is re-directed, it shall transit to 4G Init State S702.

In 4G Active & 3G/2G Init State S710, the UE 10 is configured to perform the traffic state operation on the 3G/2G system according to 3G/2G standard. If the 3G/2G system is acquired, it shall transit to 4G Active & 3G/2G Idle State S716. If the 4G traffic channel is released, it shall transit to 4G Idle &3G/2G Init State S706. If the 4G traffic channel is re-directed, it shall transit to 4G Init State S702.

The hybrid multimode method 7 employs a UE with a shared PLL circuit, providing hybrid multimode communications for the 4G and 3G/2G systems from the UE, while reducing network infrastructure complexity.

Figure 8:
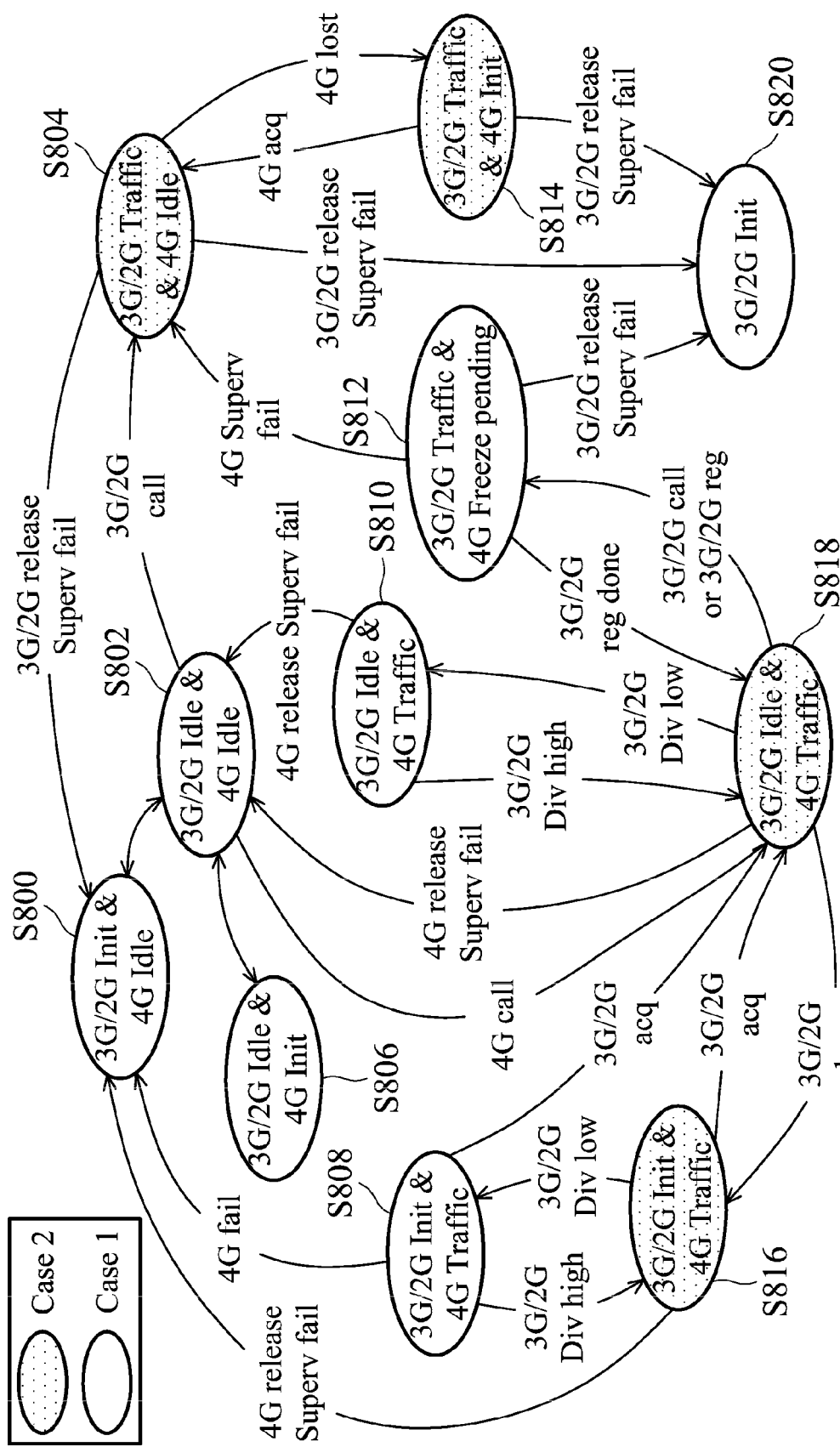
FIG. 8 is a state diagram of a hybrid multimode method 8 according to another embodiment of the invention.

FIG. 8 is a state diagram of a hybrid multimode method 8 according to another embodiment of the invention incorporating the UE 10 in FIG. 3 and the multimode communication environment 1 in FIG. 1. In the UE 10, two separately PLLs for 2 receiver paths are employed, and the two the receiving RF paths can be tuned to different RF frequency bands. In the following description, a 4G or a CDMA system may refer to the LTE network 12 in FIG. 1, the 2G/3G system may refer to the GSM network 14 in FIG. 1. Accordingly, the UE 10 can operate in one of the three possible modes: the dual-standby mode, the 3G/2G traffic mode, and the 4G LTE traffic mode.

The UE 10 may be switched between a hybrid operation (referred to as case 1 in FIG. 8) and a simultaneous 4G-3G/2G operation (referred to as case 2 in FIG. 8) based on 4G or 3G/2G received signal power.

In the hybrid dual standby mode, the both receiver paths can be assigned to 4G or 3G/2G networks at its predetermined slot time. In order to monitoring for both networks, the UE 10 needs to send an indication to inform eNode B 120 to inform that one receiver path is turned away for monitoring another system.

In the 3G/2G traffic and 4G idle mode, for the case 1, if the 3G/2G received signal power on the primary receiver path exceeds a high threshold $I_{o,high}$, the UE 10 shall switch to the simultaneous operation (case 2) before the next 3G/2G paging slot. Otherwise, the UE 10 shall remain in hybrid operation (case 1).

In the 3G/2G traffic and 4G idle mode, for the case 2, before the next 4G wake-up occurs on a substantially same frequency band, if the 3G/2G received signal power on a secondary diversity receiver path falls below a low threshold $I_{o,low}$, the UE 10 shall switch to legacy hybrid operation mode (case 1) before transitioning to the next paging slot. Otherwise, the UE 10 shall remain in the simultaneous operation (case 2). On the other hand, during the 4G wake-up at different frequency bands, if the 4G received signal power on the secondary diversity receiver path falls below a low threshold $I_{o,low}$, the UE 10 shall switch to hybrid legacy operation mode (case 1) before the next 4G paging slot. Otherwise, the UE 10 shall stay in simultaneous operation mode (case 2).

In the 3G/2G traffic and 4G idle mode, the $I_{o,high}$ threshold is determined by adding hysteresis to the $I_{o,low}$ threshold. The amount of hysteresis consists of the difference in average antenna gain between the primary and secondary antennas and an additional safety margin. The 4G traffic call shall be set up with the main antenna or both antennas if MRD is required.

In the 4G traffic and 3G/2G idle mode, both the 2 receiver paths are assigned to the LTE traffic during the 4G traffic mode, and the 3G/2G traffic is required to be wakened up every slot cycle to monitor and track its system. In order to tune-away one receiver path to the 3G/2G traffic, UE 10 needs to send the second message to eNode B 120 to suspend the MIMO data transmission from the 4G network. The second message can be set by configuring the RI as 1 if the current UE supports MIMO operation. After suspending MIMO operation, one receiver path will be tuned away from 4G traffic to monitor the 3G/2G network, while the other path continues the LTE traffic operation.

The hybrid communication method 8 employs a UE with two PLL circuits, providing concurrent multimode communications by the UE, while reducing network infrastructure complexity.

Figure 9:
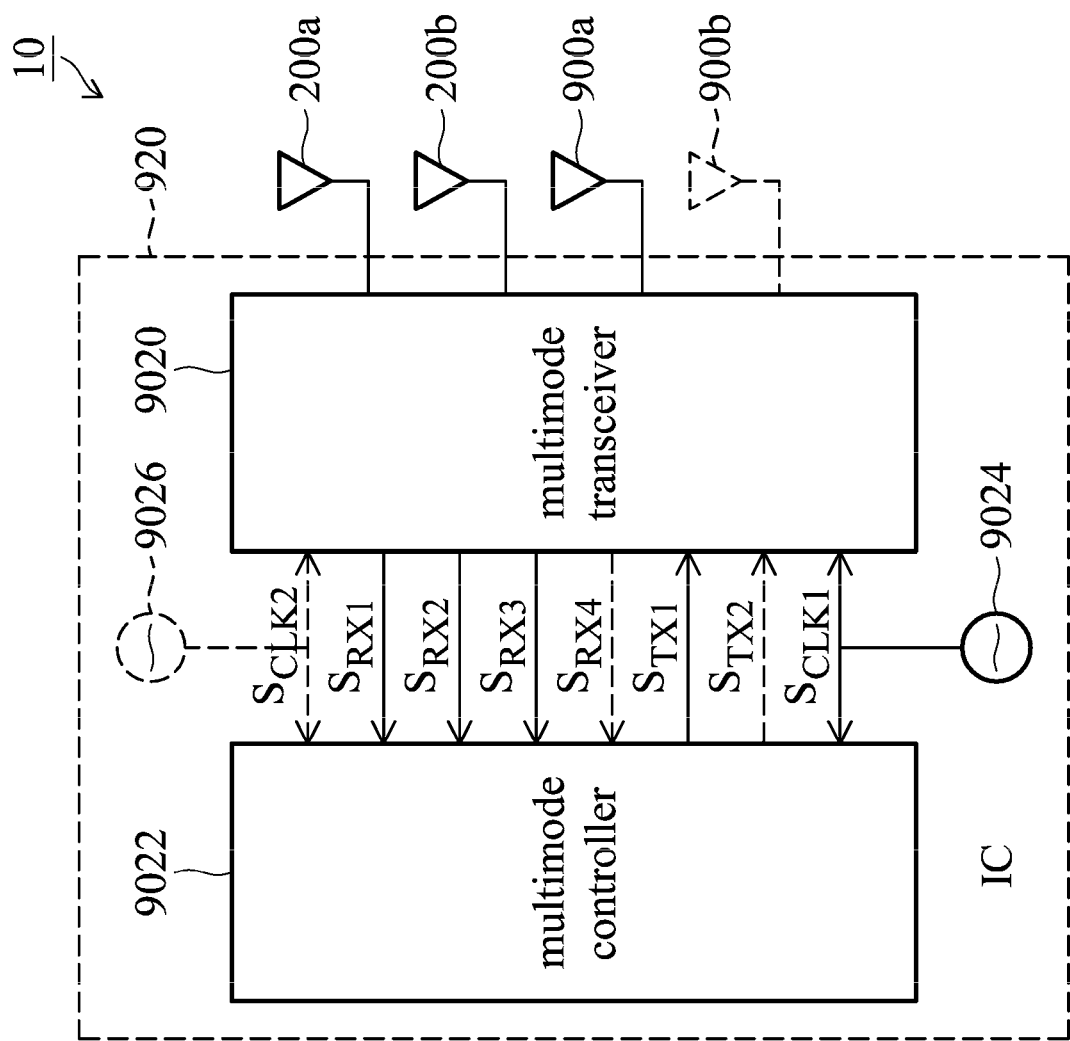
FIG. 9 is a block diagram of the UE 10 according to another embodiment of the invention.

FIG. 9 is a block diagram of the UE 10 according to another embodiment of the invention, including 4 antennas 200*a*, 200*b*, 900*a* and 900*b*, two PLL circuits 9024 and 9026, a multimode controller 9022 and a multimode transceiver 9020. In certain embodiments, the antenna 900*b*, PLL circuit 9026, the second clock signal $S_{CLK2}$, the fourth receiving signal $S_{RX4}$, and the second transmitting signal $S_{TX2}$ are optional. The following paragraphs will discuss the operations and configurations of various combinations of the devices and signals in the UE 10 in FIG. 9.

In one embodiment, the UE 10 adopts one PLL circuit 9024 for 3 or 4 receiver paths and 1 transmitter path. The UE 10 may assign all receiver paths to the LTE communications or the 3G/2G communications during wake-up, according to the timing of the paging slot for the corresponding network, or assign a part of the receiver paths to the LTE communications or the 3G/2G communications during wake-up, according to the timing of the paging slot for the corresponding network. In the 4G traffic mode, 2 or more receiver paths are assigned to 4G or to 3G/2G communications. The tune-away procedure may find reference in the preceding paragraphs for FIGS. 2, 4, and 7.

In another embodiment, the UE 10 adopts two PLL circuits 9024 and 9026 for 3 or 4 receiver paths and 1 transmitter path. The UE 10 may assign all receiver paths to the LTE communications or the 3G/2G communications during wake-up, according to the timing of the paging slot for the corresponding network, or assign a part of the receiver paths to the LTE communications or the 3G/2G communications during wake-up, according to the timing of the paging slot for the corresponding network. In the 4G traffic mode, 2 or more receiver paths are assigned to 4G or to 3G/2G communications. The tune-away procedure may find reference in the preceding paragraphs for FIGS. 3, 5, and 8.

In yet another embodiment, the UE 10 supports WiMax and 3G/2G multimode communications, containing the two PLL circuits with two oscillators and the antennas 200*a* and 200*b*. The UE 10 can operates in one of the three modes: a dual-standby mode where both the Wimax and 2G/3G communications are in standby operation, a 3G/2G traffic mode where a voice or SMS is in operation, and a 4G Wimax traffic mode where a 4G packet switched traffic is ongoing while monitoring a 2G/3G procedure such as paging, registration or SMS procedures.

In the dual-standby mode, depending on the waken-up paging slots predetermined for the LTE network 12 or GSM network 14, there may have overlapped waken-up intervals for the two networks. If there is a contention between the LTE network 12 and GSM network 14, the UE 10 will select the higher priority system to monitor the paging. If the voice is important, the GSM network 14 will be configured with a higher priority than that of the LTE network 12, resulting in a higher priority in the paging monitoring for the GSM network 14 over the 4G LTE network 12. For the low priority network, depending on its state, it can be handled differently. a) If both the higher and the lower priority networks are in the monitoring state, the UE 10 can either preempt the lower priority network, putting the lower priority network into a freeze mode and resuming its operations or activities after the higher priority system has finished its monitoring operation, or simply ignore and stop the operation of the lower priority network. b) If the lower priority network is in a sleeping state, instead of being waken up the and monitoring slot for the lower priority network, the UE 10 can let the lower priority network continue to sleep until its next designated monitoring slot or ignore the lower priority network's wake up request until the higher priority system has finished its task. There are some other embodiments: (1) both of the receiver paths in the UE 10 are assigned to the LTE network 12 during being waken-up or assigned to the GSM network 14 during its wake-up depending on the wake-up slot. (2) Only one of the two receiver paths is assigned to the LTE network 12 during wake-up or to GSM network 14 during its wake-up depending on the wake-up slot.

In the dual standby mode, the antenna 200*a* is assigned to the Wimax traffic, antenna 200*b* is assigned to the 3G/2G traffic. One or more antennas can be assigned to either 3G/2G or Wimax traffics.

In 3G/2G traffic mode, the antenna 200*a* is assigned to the 3G/2G traffic. One or more antennas can be assigned to the 3G/2G traffic.

In the Wimax traffic mode, the antenna 200*a*, as well as antennas 900*a* and 900*b*, are assigned to the Wimax traffic. The antenna 200*b* is assigned to Wimax in most of time, but assigned to 3G/2G in small amount of time. In most of time of Wimax traffic mode, all antennas and the multimode transceiver work for Wimax communications. Certain time (t1) before the 3G/2G traffic starts to get an antenna 200*b* from Wimax traffic, the UE 10 needs to decode a feedback rank, CQI and precoding matrix to base station 140 according to the number of antennas being used. If the UE 10 has 2 antennas, the UE 10 should feedback matrix A in matrix indicator and the CQI and best precoding matrix calculated by the receiver path of the antenna 200*a*. If the UE 10 has more than 2 antennas, the UE 10 should feedback the CQI and best precoding matrix calculated by the receiver path of all antennas except that of the antenna 200*b*, and the matrix indicator of either matrix B/C with the rank not larger than the number of antennas −1 or matrix A. After the UE 10 feedbacks the CQI, precoding matrix and matrix indicator, the multimode controller 9022 turns on the second PLL circuit 9026, adjusting parameters including, bandwidth, frequency for the second receiving path, to comply with the 3G/2G network and keeping the other receiver paths for Wimax. After the receiver path and 3G/2G receiver settle down, the UE 10 starts to search for the 3G/2G signal or receive 3G/2G broadcast messages. If the multimode controller 9022 would like to send data to 3G/2G base station 140, it can do so by sending through the antenna 200*b*. After 3G/2G traffic finishes using the antenna 200*b*, the multimode controller 9022 adjusts the parameters of the receiver path working for 3G/2G, including bandwidth, frequency, back to Wimax's configuration. After the second PLL circuit 9026, and the Wimax receiver path settle down, the multimode controller 9022 start to receive Wimax signal from the antenna 200*b* and resume feeding back CQI & RI on basis of all antennas's signal as usual. In another embodiment, more antennas may work for 3G/2G traffic in small amount of time, like the antenna 200*b*.

In another embodiment, the UE 10 contains a single multimode transceiver, single multimode controller, 3 or 4 antennas, with an architecture given in FIG. 9. The multimode controller 9022 can be 4G/3G or 4G/2G and RF can be 4G/3G or 4G/2G RF in some embodiments.

As used herein, the term "determining" encompasses calculating, computing, processing, deriving, investigating, looking up (e.g., looking up in a table, a database or another data structure), ascertaining and the like. Also, "determining" may include resolving, selecting, choosing, establishing and the like.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device, discrete gate or transistor logic, discrete hardware components or any combination thereof designed to perform the functions described herein. A general purpose processor may be a microprocessor, but in the alternative, the processor may be any commercially available processor, controller, microcontroller or state machine.

The operations and functions of the various logical blocks, units, modules, circuits and systems described herein may be implemented by ways of, but not limited to, hardware, firmware, software, software in execution, and a combination thereof.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A mobile communication device, communicating with a packet switched network and a second network, comprising:
    a transceiver, when exchanging an ongoing data transmission with the packet switched network, configured to transmit a first message to the packet switched network, which indicates the mobile communication device will be tuned away from the packet switched network, and perform a subsequent procedure for the second network;
    a first Phase-Locked Loop (PLL) circuit, configured to provide a first clock to the transceiver; and
    a controller, configured to receive first and second received signals from the transceiver and transmit a first transmitted signal to the transceiver, and when the ongoing data transmission with the packet switched network is not completed, configured to control the first PLL circuit to switch the first clock from a first clock frequency to a second clock frequency after the transceiver transmits the first indication message;
    wherein the ongoing data transmission is suspended and the subsequent procedure is performed after the transceiver transmits the first indication message.

2. The mobile communication device of claim 1, further comprising:
    first and second antennas, coupled to the transceiver, wherein the first antenna is configured to be tuned away from the packet switched network to the second network.

3. The mobile communication device of claim 2, wherein the second antenna is configured to be tuned away from the packet switched network to the second network.

4. The mobile communication device of claim 2, further comprising:
    a second PLL circuit, configured to provide a second clock with the first clock frequency to the transceiver;
    wherein the second antenna is configured to proceed with the ongoing data transmission with the packet switched network.

5. The mobile communication device of claim 4, wherein:
    the controller is further configured to control the second PLL circuit to switch the first clock from the first clock frequency to a third clock frequency; and
    the second antenna is configured to be tuned away from the packet switched network to the second network.

6. The mobile communication device of claim 2, wherein:
    the transceiver is further configured to transmit a second message to the packet switched network, which indicates only the second antenna is used for the ongoing data transmission.

7. The mobile communication device of claim 6, wherein the second message comprises a Rank Indication (RI) being 1.

8. The mobile communication device of claim 1, wherein the first message indicates a suspension of the ongoing data transmission.

9. The mobile communication device of claim 1, wherein the first message comprises a Channel Quality Information (CQI) being 0.

10. The mobile communication device of claim 1, wherein:
    after the subsequent procedure for the second network is completed, the controller is further configured to determine whether a first time duration has expired since the suspension of the ongoing data transmission, when the first time duration has not yet expired, resume the ongoing data transmission with the packet switched network.

11. The mobile communication device of claim 10, wherein:
    when the first time duration has expired, the controller is further configured to establish a connection with the packet switched network.

12. An integrated circuit, adopted by a mobile communication device communicating with a fourth generation (4G) network and a second network, comprising:
    a transceiver, when exchanging an ongoing data transmission with the packet switched network, configured to transmit a first message to the packet switched network, which indicates the mobile communication device will be tuned away from the packet switched network, and perform a subsequent procedure for the second network;
    a first Phase-locked Loop (PLL) circuit, configured to provide a first clock to the transceiver; and
    a controller, configured to receive first and second received signals from the transceiver and transmit a first transmitted signal to the transceiver, and when the ongoing data transmission with the packet switched network is not completed, configured to control the first PLL circuit to switch the first clock from a first clock frequency to a second clock frequency after the transceiver transmits the first indication message;
    wherein the ongoing data transmission is suspended and the subsequent procedure is performed after the transceiver transmits the first indication message.

13. The integrated circuit of claim 12, wherein:
    the transceiver is further coupled to first and second antennas, configured to control the first antenna to be tuned away from the packet switched network to the second network.

14. The integrated circuit of claim 13, further comprising:
    a second PLL circuit, configured to provide a second clock with the first clock frequency to the transceiver,
    wherein the transceiver is further configured proceed with the ongoing data transmission with the packet switched network via the second antenna.

15. The integrated circuit of claim 14, wherein:
    the controller is further configured to control the second PLL circuit to switch the first clock from the first clock frequency to a third clock frequency; and
    the transceiver is further configured to control the second antenna to be tuned away from the packet switched network to the second network.

16. The integrated circuit of claim 13, wherein:
    the transceiver is further configured to transmit a second message to the packet switched network, which indicates only the second antenna is used for the ongoing data transmission.

17. The integrated circuit of claim 16, wherein the second message comprises a Rank Indication (RI) being 1.

18. The integrated circuit of claim 12, wherein the first message indicates a suspension of the ongoing data transmission.

19. The integrated circuit of claim 12, wherein the first message comprises a Channel Quality Information (CQI) being 0.

20. The integrated circuit of claim 12, wherein:
after the subsequent procedure for the second network is completed, the controller is further configured to determine whether a first time duration has expired since the suspension of the ongoing data transmission, when the first time duration has not yet expired, resume the ongoing data transmission with the packet switched network.

* * * * *